(12) United States Patent
Hayakawa

(10) Patent No.: US 10,226,796 B2
(45) Date of Patent: Mar. 12, 2019

(54) METHOD FOR CLEANING DRINK FILLING SYSTEM

(71) Applicant: DAI NIPPON PRINTING CO., LTD., Tokyo (JP)

(72) Inventor: Atsushi Hayakawa, Tokyo (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 0 days.

(21) Appl. No.: 14/438,373

(22) PCT Filed: Nov. 14, 2013

(86) PCT No.: PCT/JP2013/080792
§ 371 (c)(1),
(2) Date: Apr. 24, 2015

(87) PCT Pub. No.: WO2014/077319
PCT Pub. Date: May 22, 2014

(65) Prior Publication Data
US 2015/0298178 A1 Oct. 22, 2015

(30) Foreign Application Priority Data

Nov. 16, 2012 (JP) ................................. 2012-252070

(51) Int. Cl.
*B08B 9/027* (2006.01)
*B67C 3/00* (2006.01)
*A47J 31/60* (2006.01)

(52) U.S. Cl.
CPC .............. *B08B 9/027* (2013.01); *B67C 3/001* (2013.01); *B67C 3/005* (2013.01); *A47J 31/60* (2013.01)

(58) Field of Classification Search
None
See application file for complete search history.

(56) References Cited

U.S. PATENT DOCUMENTS 6,161,557 A * 12/2000 Wakabayashi ........ B08B 9/0325
134/22.13
2004/0118291 A1* 6/2004 Carhuff ................. A47J 31/401
99/275

(Continued)

FOREIGN PATENT DOCUMENTS

CN 101955146 A 1/2011
JP 11-208782 A 8/1999

(Continued)

OTHER PUBLICATIONS

English Machine Translation of JP 2011-148517.*

(Continued)

*Primary Examiner* — Nicole Blan
*Assistant Examiner* — Pradhuman Parihar
(74) *Attorney, Agent, or Firm* — Burr & Brown, PLLC

(57) ABSTRACT

An object of the present invention is to make short a manufacturing time at a time of switching a kind of a filling drink. In a cleaning method of a drink filling system provided with a drink supply pipe line for supplying a drink to a filling machine (2) and an aseptic chamber (3) surrounding at least the filling machine, the cleaning method is performed by executing program including at least two of first, second and third programs, wherein the first program corresponds to an aseptic carbonated drink and executes a COP treatment performed for an interior of the aseptic chamber and a CIP treatment performed for an interior of the drink supply pipe line, the second program corresponds to a high acidic drink and executes the COP treatment and an SOP treatment performed for the interior of the aseptic chamber and a CIP treatment and an SIP treatment performed in the interior of the drink supply pipe line, and the third program corresponds to a low acidic drink and executes the COP treatment and the SOP treatment performed for the interior of the aseptic chamber and the CIP treatment and the SIP (Continued)

treatment performed in the interior of the drink supply pipe line, and wherein either one of the three programs is enabled to be selectively executed, and in a case where the drink is an aseptic carbonated drink, the first program is selected, in a case where the drink is a high acidic drink, the second program is selected, and in a case where the drink is a low acidic drink, the third program is selected, to thereby clean the interiors of the aseptic chamber and the drink supply pipe line before filling of the drink in accordance with the selected program.

4 Claims, 10 Drawing Sheets

(56) References Cited

U.S. PATENT DOCUMENTS

| | | | |
|---|---|---|---|
| 2004/0173284 A1 | 9/2004 | Rosen | |
| 2010/0037984 A1* | 2/2010 | Hiroya | B67C 7/0073 141/59 |
| 2011/0315711 A1* | 12/2011 | Hecht | A47J 31/52 222/129.1 |

FOREIGN PATENT DOCUMENTS

| | | | | |
|---|---|---|---|---|
| JP | 2000-153245 A | 6/2000 | | |
| JP | 2003-267492 A | 9/2003 | | |
| JP | 2007-22600 A | 2/2007 | | |
| JP | 2007-276819 A | 10/2007 | | |
| JP | 2007-331801 A | 12/2007 | | |
| JP | 2011-121622 A | 6/2011 | | |
| JP | 2011-148517 | * 8/2011 | ............ | B65B 55/04 |
| JP | 2011-148517 A | 8/2011 | | |
| JP | 2011-255938 A | 12/2011 | | |
| WO | 2008/012996 A1 | 1/2008 | | |
| WO | 2009/098599 A2 | 8/2009 | | |
| WO | 2010/137486 A1 | 12/2010 | | |
| WO | 2012/097838 A1 | 7/2012 | | |
| WO | 20141077319 A1 | 5/2014 | | |

OTHER PUBLICATIONS phmeters.com.*

International Search Report dated Dec. 6, 2013; PCT/JP2013/080792.

* cited by examiner

FIG.9 (CIP, SIP, COP, SOP before filling of low acidic carbonated drink)

METHOD FOR CLEANING DRINK FILLING SYSTEM

TECHNICAL FIELD

The present invention relates to a method for cleaning a system for filling a container such as PET bottle with drink.

BACKGROUND TECHNOLOGY

In a conventional technology in an aseptic drink filling system, when it is required to change a kind of drink to fill a container such as bottle so as to change tea, for example, now in the container to another drink such as coffee with milk, a CIP (Cleaning In Place) treatment is first performed to an inside of a drink supply pipe line or arrangement in an aseptic filling system and an SIP (Sterilizing In Place) treatment is thereafter performed (see, for example, Patent Document 1).

The CIP treatment is performed, for example, by flowing a cleaning liquid prepared with water to which alkaline chemical agent such as caustic soda is added in a flow path from an inside of a pipe line of a drink filling path to a filling nozzle of a filling machine, and thereafter, by filling a cleaning liquid prepared with water to which acidic chemical agent is added. According to such treatment, remaining content of previously filled drink adhering to the drink filling path can be removed (see, for example, Patent Documents 1, 2, and 3).

The SIP treatment is performed, for example, by circulating steam or heated water through the drink filling path cleaned by the CIP treatment mentioned above. According to such treatment, the interior of the drink filling path can be sterilized to thereby provide an aseptic condition (see, for example, Patent Document 1).

Further, in an aseptic filling system, a filler for automatically filling a container with drink, and such filler is surrounded by an aseptic chamber to be shut off from an exterior. Further, since droplets or like of the drink previously filled in a drink filling operation sticks on an inside of the aseptic chamber, a COP (Cleaning Out Of Place) treatment is performed to the aseptic chamber at a time when the kind of drink for filling is changed to thereby remove the droplets or like of the drink stuck in the previous filling operation to the inner wall of the aseptic chamber and an outer surface of an equipment such as filler disposed inside the aseptic chamber.

The COP treatment is performed, for example, by atomizing water into the aseptic chamber in a state of shower.

Furthermore, there is a fear such that bacteria or like may invade into the aseptic chamber during various operations or workings at a time of changing a kind of drink for filling, and hence, an SOP (Sterilizing Out Of Place) treatment is also performed) see, for example, Patent Document 4).

The SOP treatment is performed in a manner such that hydrogen peroxide water, for example, in a state of mist or shower, is supplied into the aseptic chamber, and thereafter, hot air is blasted into the aseptic chamber to thereby dry remaining hydrogen peroxide.

PRIOR ART DOCUMENT

Patent Document

Patent Document 1: Japanese Patent Laid-open Publication No. 2007-22600

Patent Document 2: Japanese Patent Laid-open Publication No. 2007-331801

Patent Document 3: Japanese Patent Laid-open Publication No. 2000-153245

Patent Document 4: Japanese Patent Laid-open Publication No. HEI 11-208782

SUMMARY OF THE INVENTION

Problem to be Solved by the Invention

In conventional art, when a kind of drink for filling is changed, all the CIP treatment, SIP treatment, COP treatment and SOP treatment have been always performed regardless of the kind of drink after the change. Moreover, in the SIP treatment and the SOP treatment, sterilizing treatment has been performed till the inside of the pipe line and the inside of the aseptic chamber become sterilized state.

Because of such reason, a downtime, i.e., time interval from a production of a product, i.e., some bottled drink, to a production of a product, i.e., another bottled drink, is made long, which results in a cause of deterioration in production efficiency (productivity). Especially, in a factory that produces small lot and many kinds of product, since many kinds of drinks are to be changed, the production efficiency further becomes worse.

An object of the present invention is to provide a method for cleaning a drink filling system capable of solving the problems encountered in the prior art mentioned above.

Means for Solving the Problem

In order to achieve the above object, the present invention adopts the following constitution.

It is further to be noted that although the description is made with parentheses to reference numerals in figures, the present invention is not limited thereto.

The invention according to claim 1 is a cleaning method for a drink filling system provided with a drink supply pipe line for supplying a drink to a filling machine (2) and an aseptic chamber (3) surrounding at least the filling machine, the cleaning method being performed by executing program including at least two of first, second and third programs, wherein the first program corresponds to an aseptic carbonated drink and executes a COP treatment performed for an interior of the aseptic chamber (3) and a CIP treatment performed for an interior of the drink supply pipe line, the second program corresponds to a high acidic drink and executes the COP treatment and an SOP treatment performed for the interior of the aseptic chamber and a CIP treatment and an SIP treatment performed in the interior of the drink supply pipe line, and the third program corresponds to a low acidic drink and executes the COP treatment and the SOP treatment performed for the interior of the aseptic chamber and the CIP treatment and the SIP treatment performed in the interior of the drink supply pipe line, and wherein either one of the three programs is enabled to be selectively executed, and in a case where the drink is an aseptic carbonated drink, the first program is selected, in a case where the drink is a high acidic drink, the second program is selected, and in a case where the drink is a low acidic drink, the third program is selected, to thereby clean the interiors of the aseptic chamber (3) and the drink supply pipe line before filling of the drink in accordance with the selected program.

As defined in claim 2, in the cleaning method according to claim 1, the CIP treatment performed by the first to third programs may include a CIP treatment using alkali cleaning liquid.

As defined in claim 3, it may be preferred that the drink supply pipe line is provided with a carbonic acid adding apparatus, the second program for the high acidic drink includes two patterns including a carbonic acid addition case and a carbonic acid non-addition case, and the third program for the low acidic drink includes two patterns including a carbonic acid addition case and a carbonic acid non-addition case.

Effects of the Invention

According to the present invention, at a time when the drink filling system is cleaned, it is possible to select an appropriate cleaning method suitable for a kind of a filling drink. Therefore, a part of a cleaning or sterilizing process that is conventionally required can be eliminated as an excessive or unnecessary cleaning or sterilizing process, resulting in shortage of a manufacturing time and improving manufacturing efficiency.

BRIEF DESCRIPTION OF THE DRAWINGS

FIG. 9 is a block diagram illustrating a state in which a CIP treatment, an SIP treatment, a COP treatment and a SOP treatment are performed before production of a bottled product of a low acidic carbonated drink.

EMBODIMENT FOR CARRYING OUT THE INVENTION

Hereunder, an embodiment of the present invention will be explained with reference to the accompanying drawings.

A structure of a drink filling system is first explained herein, and then, a method for cleaning this drink filling system will be explained.

Figure 1:
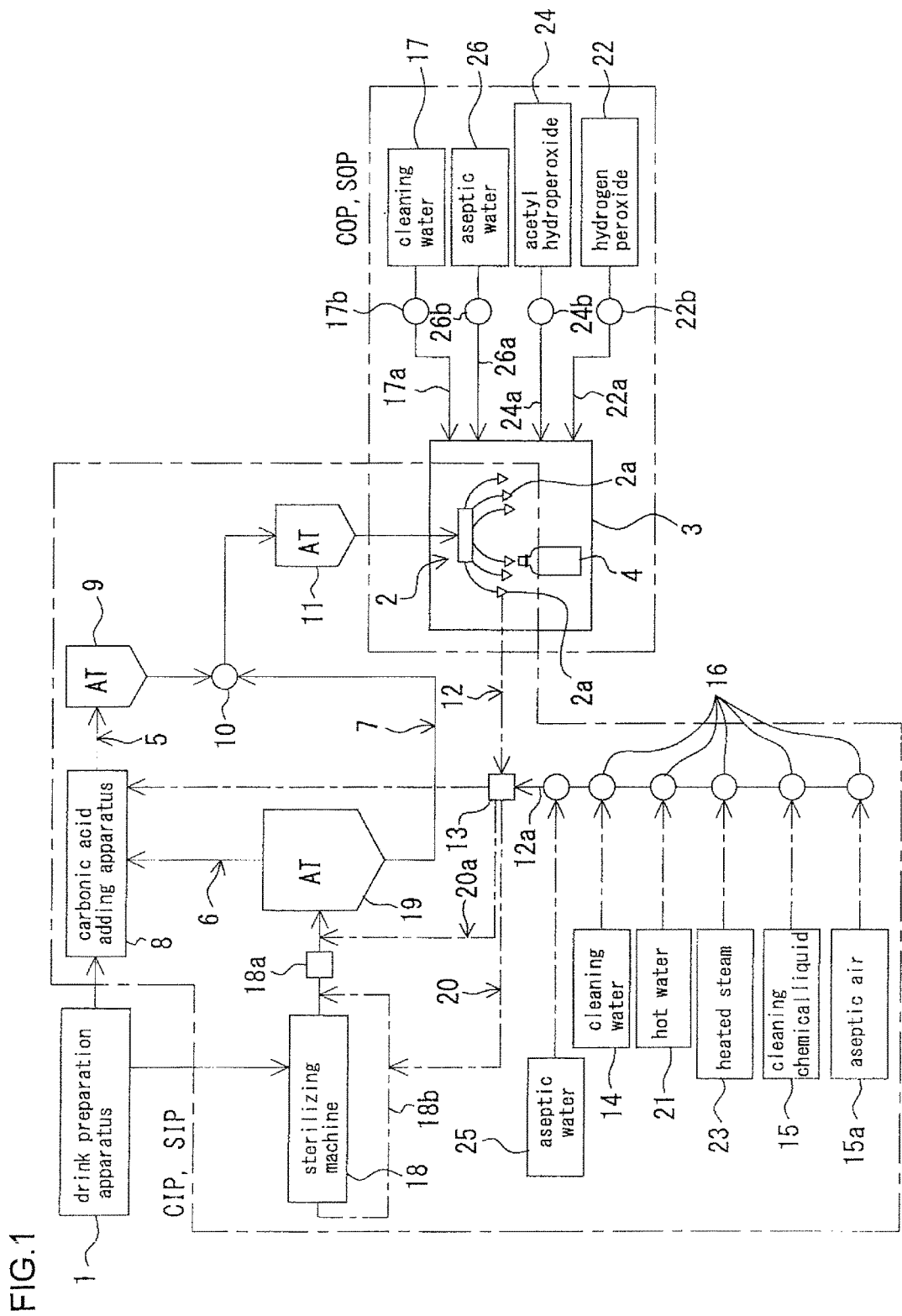
FIG. 1 is a block diagram of a drink filling system according to the present invention.

As shown in FIG. 1, a drink filling system includes a drink preparation apparatus 1 and a filling machine 2 for filling a container such as bottle with drink. The preparation apparatus 1 and the filling machine 2 are connected through a drink supply pipe line. The filling machine 2 is surrounded by an aseptic chamber 3.

The preparation apparatus 1 is an apparatus for preparing, for example, tea drink, fruit drink and the like at a predetermined composition rate (blended rate), and since such preparation apparatus is known one, detailed explanation thereof is omitted herein.

The filling machine 2 is a machine provided with a wheel (not shown) that rotates a number of filling nozzles 2a at high speed in a horizontal plane, and this machine for filling bottles 4 travelling in synchronism with a peripheral speed of the wheel under the filling nozzles 2a with a constant amount of drink from the filling nozzles 2a, respectively, while rotating in conformation with the rotation of the wheel. Further, this filling machine 2 is also known one, and accordingly, detailed explanation thereof is omitted herein.

The drink supply pipe line of this drink filling machine is provided with three, i.e., first, second and third, supply pipe lines 5, 6, 7 so as to selectively fill a container with either one of non-sterilized carbonated drink, high acidic carbonated drink, low acidic carbonated drink, high acidic drink and low acidic drink.

Figure 2:
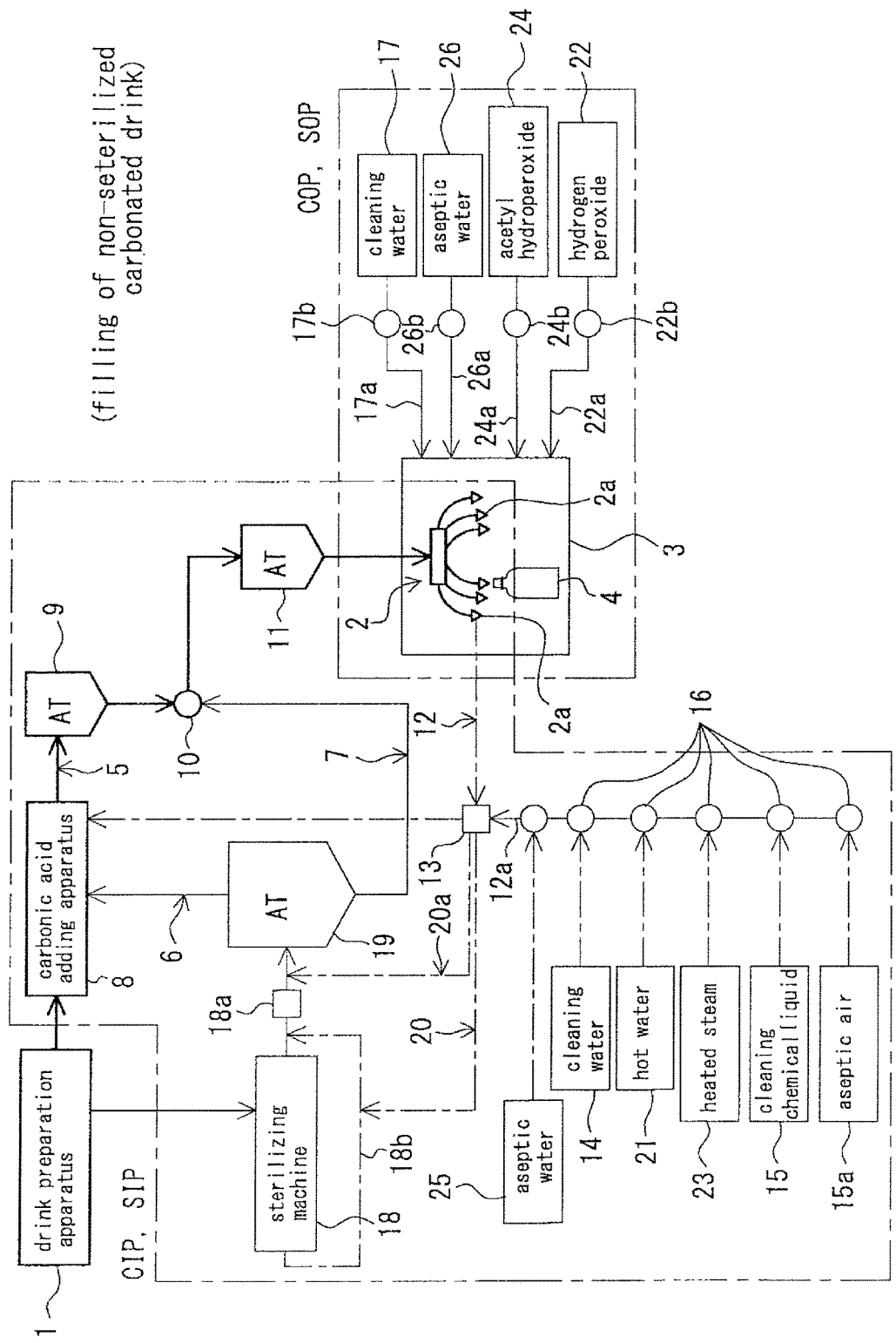
FIG. 2 is a block diagram illustrating a process of producing a bottled product of a non-sterilized carbonated drink.

The first supply pipe line 5 is for supplying the non-sterilized carbonated drink to the filling machine 2, and as shown in FIG. 2 with thick line, a carbonic acid adding apparatus 8, a first aseptic tank 9, a switch (change-over) valve 10, and a second aseptic tank 11 in this order from an upstream side toward a downstream side on the pipe line from the preparation apparatus 1 toward the filling machine 2.

The carbonic acid adding apparatus 8 is an apparatus for injecting carbonic acid into a predetermined drink flowing inside the pipe line, and the aseptic tanks 9 and 11 are buffer tank or storage tank for temporarily storing the drink to which the carbonic acid is injected. These carbonic acid adding apparatus 8 and the aseptic tanks 9, 11 are known ones, and hence, detailed explanations thereof are omitted herein.

The non-sterilized drink mentioned herein is a drink having $CO_2$ pressure of more than 1.0 kgf/cm$^2$ (20° C.) and including no plant and/or animal component or composition, and in such drink, since metabolism of bacteria is not carried out, the drink is not subjected to become corrupt by the bacteria even if the drink fills a container such as bottle 4 without sterilizing inside the drink supply pipe line, the filling machine 2 and the aseptic chamber 3.

As shown in FIG. 2, the non-sterilized carbonated drink is produced by preparing a drink by the preparation apparatus 1 and sending such drink to the carbonic acid adding apparatus 8, in which carbonic acid is mixed with such drink. This non-sterilized carbonated drink is delivered to the filling machine 2 via the first aseptic tank 9, the switch valve 10, and the second aseptic tank 11, and a constant amount of such drink fills, from the nozzle 2a of the filling machine 2, each of the bottles 4 which are now travelling below a nozzle 2a.

A CIP treatment apparatus is provided for the first supply pipe line 5 and the filling machine 2.

Figure 5:
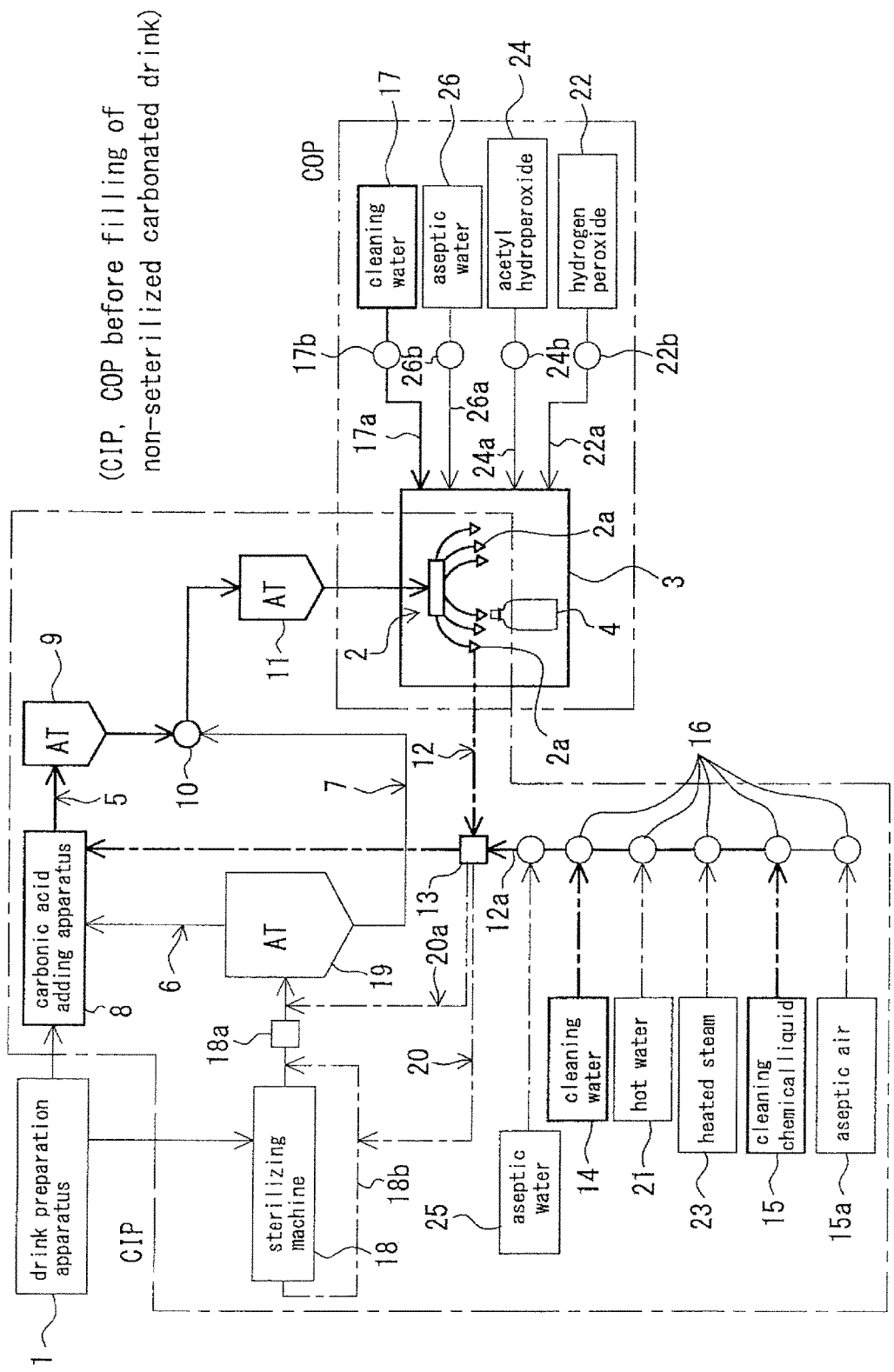
FIG. 5 is a block diagram illustrating a state in which a CIP treatment and a COP treatment are performed before production of a bottled product of a non-sterilized carbonated drink.

That is, as shown with thick line in FIG. 5, the CIP treatment pipe line 12 is connected to the first supply pipe line 5, and these pipe lines and associated members are combined, which constitutes a circulation path as an entire structure for flowing cleaning water or like.

More specifically, this circulation path extends from the carbonic acid adding apparatus 8 as starting end of the first supply pipe line 5 toward the filling machine 2, and then extends from the filling nozzle 2a of the filling machine 2 and is connected to the starting end of the CIP treatment pipe line 12, the terminal end of which is connected to the carbonic acid adding apparatus 8, thus constituting a closed loop. The connection between the filling nozzle 2a of the filling machine 2 and the CIP treatment pipe line 12 is performed, though not shown, by applying a cup provided for the CIP treatment pipe line 12 to the front end portion of the filling nozzle 2a of the filling machine 2 by an actuator.

An introduction conduit 12a for cleaning water or like is connected to the circulation path through a valve manifold 13, and a cleaning water supply source 14, and a cleaning chemical liquid supply source 15 are connected to the upstream side of the introduction conduit 12a through switch valves 16, respectively.

Various other types of valves, pumps or like are provided for the circulation path and the introduction conduit, which are however not shown in the attached drawings.

Further, a COP treatment apparatus is also provided for the first supply pipe line 5 and the filling machine 2 in addition to the CIP treatment apparatus.

That is, as shown with a thick line in FIG. 5, a cleaning water supply source 17 is connected to the aseptic chamber 3 through a COP treatment pipe line 17a, and a spray nozzle or sprinkler head, both not shown, for spraying or atomizing the cleaning water into the aseptic chamber is provided to a portion of the aseptic chamber 3 at which the COP treatment pipe line 17a faces the interior of the aseptic chamber 3. Furthermore, a switch valve 17b and a pump, not shown, are provided for the COP treatment pipe line 17a.

Figure 3:
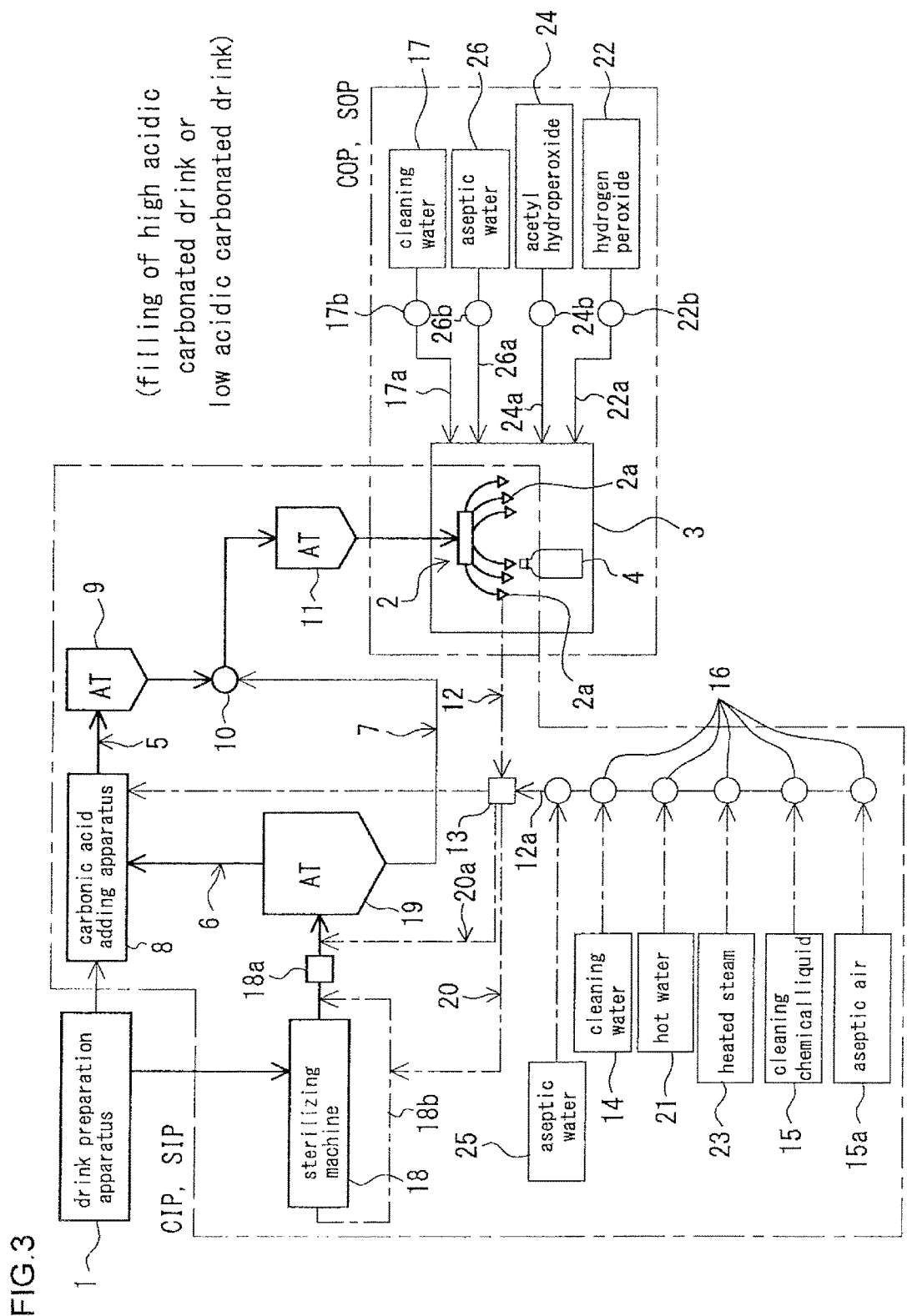
FIG. 3 is a block diagram illustrating a process of producing a bottled product of a high acidic carbonated drink or a low acidic carbonated drink.

The second supply pipe line 6 is one for supplying a high acidic carbonate drink or low acidic carbonated drink to the filling machine 2, and as shown with a thick line in FIG. 3, a pipe line from the preparation apparatus 1 to the carbonate acid adding apparatus 8 in the pipe line from the preparation apparatus 1 to the filling machine 2 constitutes a bypass circuit line, and a pipe line from the carbonate acid adding apparatus 8 to the filling machine 2 is commonly used for the first supply pipe line. In the bypass pipe line, a sterilizing machine 18 and a third aseptic tank 19 are provided from the upstream side to the downstream side as viewed in the drink flow.

Herein, the high acidic carbonated drink is a high acidic drink mixed with carbonic acid. The high acidic carbonated drink is a drink having a pH of less than 4.6 (pH<4.6) prescribed according to indication of the U.S. FDA, but in consideration of the growing characteristics of gem by pH, it may be preferred that a drink having pH of less than 4 (pH<4.0) is defined as high acidic drink.

With the high acidic drink, as long as mold, yeast and nursing cell of bacteria are sterilized, even if spore fungus remains alive, it is difficult for the spore fungus to grow, and, hence, the high acidic drink is a drink which does not become corrupt because of prevention of germination of the fungus.

On the other hand, the low acidic carbonated drink is a low acidic drink to which carbonic acid is mixed. If the low acidic drink is defined by the indication of the FDA, it is a drink having pH of not less than 4.6 (pH≥4.6). However, in consideration of the growing characteristics of the fungus by pH, it may be preferred that a drink having pH not less than 4.0 (pH≥4.0) is defined as a low acidic drink, which is sufficiently sterilized.

The low acidic drink is a drink that has a fear of being corrupted even if the spore fungus as well as mold and yeast are not sterilized.

As shown with thick line in FIG. 3, the high acidic drink or low acidic drink is produced by being prepared by the preparation apparatus 1, delivering the prepared one to the carbonic acid adding device 8 via the sterilizing machine 18 and the third aseptic tank 19, and being mixed with carbonic acid in the carbonic acid adding device 8. The thus prepared high acidic carbonated drink or low acidic carbonated drink is then delivered to the filling machine 2 via the first aseptic tank 9, the switching valve 10 and the second aseptic tank 11. Thereafter, such drink fills each bottle 4 travelling below the filling nozzle 2a of the filling machine 2 with a predetermined amount.

The CIP and SIP apparatus are provided for the second supply pipe line 6 and the filling machine 2.

Figure 7:
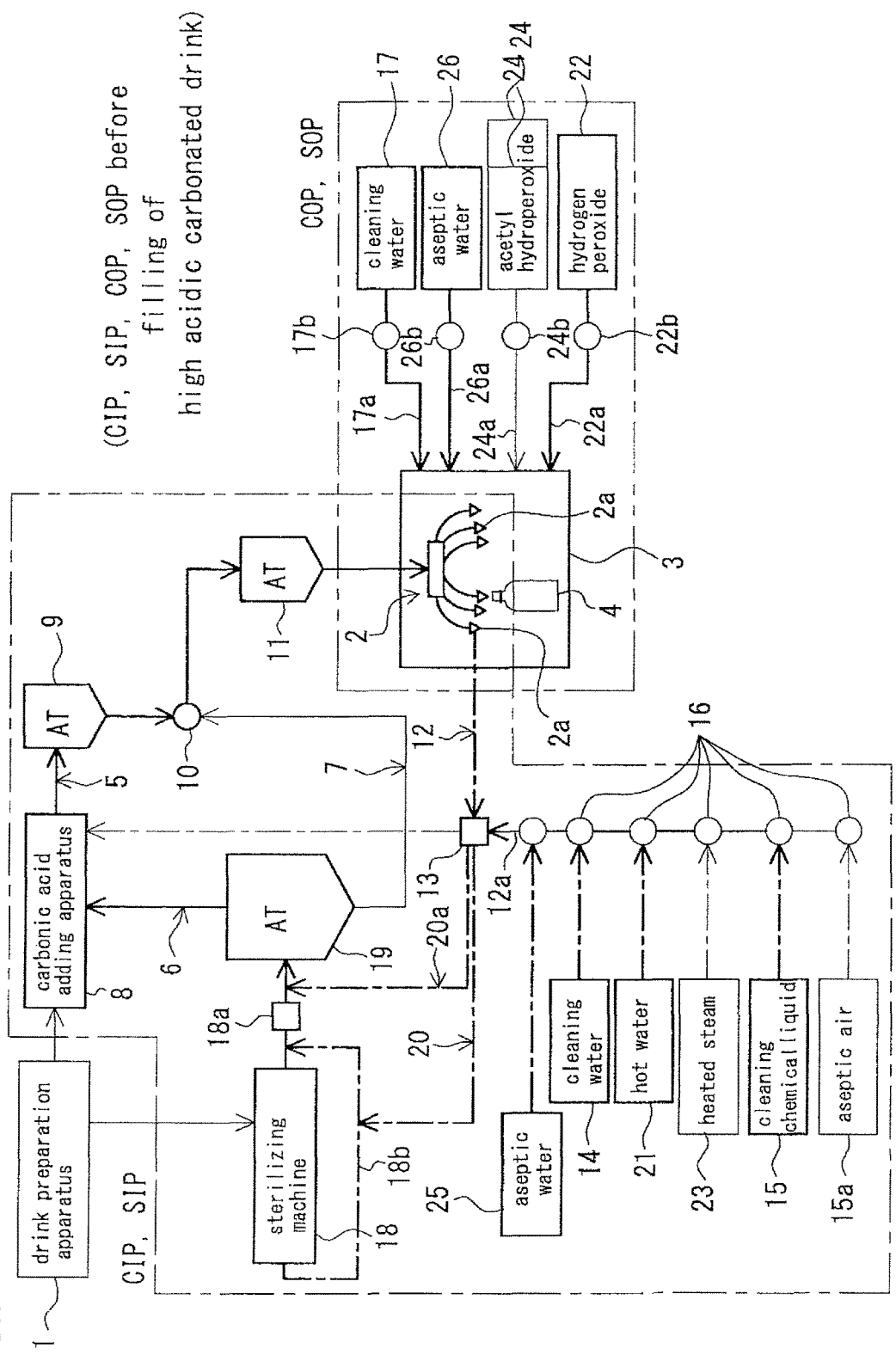
FIG. 7 is a block diagram illustrating a state in which a CIP treatment, an SIP treatment, a COP treatment and a SOP treatment are performed before production of a bottled product of a high acidic carbonated drink.

That is, as shown with thick line in FIG. 7 or 9, the pipe lines 20, 20a of the CIP and SIP apparatus are connected to the second supply pipe line 6 to thereby constitute two circulation paths.

More specifically, a valve manifold 18a is provided for a pipe line connecting the sterilizing machine 18 and the third aseptic tank 19, and a bypass route 18b bypassing the sterilizing machine 18 is provided on the upstream side of the valve manifold 18a. These bypass route 18b and the sterilizing machine 18 constitute a first circulation path. The CIP and SIP treatment pipe line 20 extending from the valve manifold 13 is connected to this first circulation path.

Further, the CIP and SIP treatment pipe line 20a extending from the valve manifold 13 is connected to the downstream side from the valve manifold 18a in the pipe line connecting the sterilizing machine 18 and the third aseptic tank 19. The CIP treatment pipe line 12 extends from the filling machine 2 toward the valve manifold 13. Thus, the second circulation path is constituted by the third aseptic tank 19, the carbonic acid adding device 8, the first aseptic tank 9, the second aseptic tank 11 and the filling machine 2.

Furthermore, the hot water supply source 15 and the aseptic water supply source 25 for the SIP treatment are connected to the introduction conduit 12a connected to the valve manifold 13 in addition to the cleaning water supply source 14 and the cleaning chemical liquid supply source 15.

In addition, the COP and SOP treatment apparatus are provided for the aseptic chamber 3 of the filling machine 2.

That is, the cleaning water supply source 17 shown in FIG. 5 is commonly used, and the hydrogen peroxide supply source 22 is additionally provided together with the SOP treatment pipe line 22a and the switching valve 22b.

Figure 4:
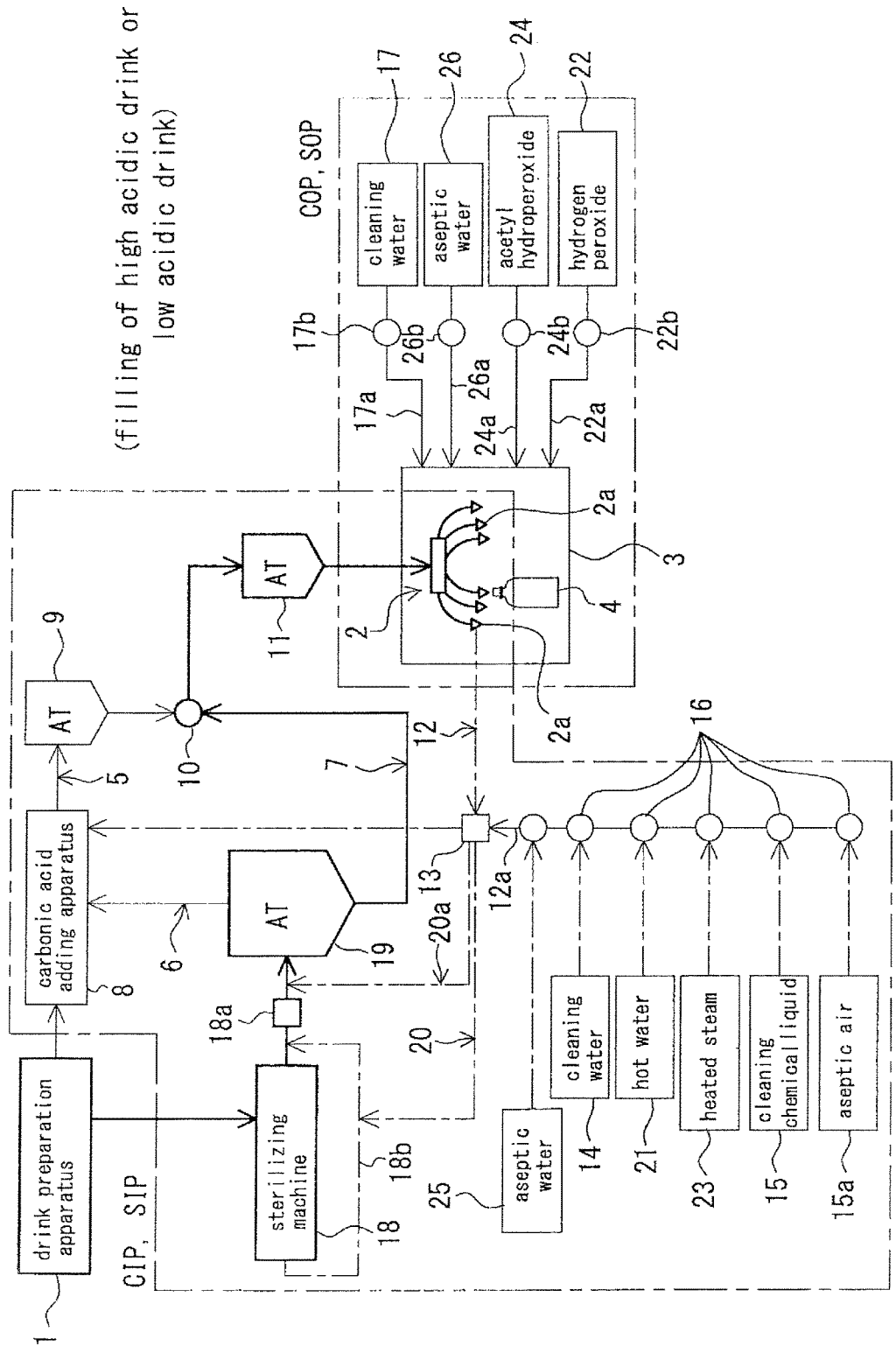
FIG. 4 is a block diagram illustrating a process of producing a bottled product of a high acidic drink or a low acidic drink.

The third supply pile line is for supplying the high acidic drink or low acidic drink to the filling machine 2, and as shown with a thick line in FIG. 4, among the pipe lines from the preparation apparatus 1 toward the filling machine 2, a part from the preparation apparatus 1 to the switching valve 10 is formed as a bypass line partially commonly used with the second supply pipe line 6, and a part from the switching valve 10 to the filling machine 2 is commonly used with the first and second supply pipe lines 5 and 6. On the way of such bypass route, the sterilizing machine 18 and the third aseptic tank 19 are provided from the upstream side toward the downstream side as viewed in the drink flow direction.

Herein, the high acidic drink or low acidic drink is a drink not mixed with carbonic acid.

As shown in FIG. 4 the high acidic drink or low acidic drink is produced by being prepared by the preparation apparatus 1, and delivered to the filling machine 2 from the preparation apparatus 1 via the sterilizing machine 18, the third aseptic tank 19, the switching valve 10 and the second aseptic tank 11, and thereafter, such drink fills each bottle 4 travelling below the filling nozzle 2a of the filling machine 2 with a predetermined amount.

The CIP and SIP treatments apparatus are provided for the third supply pipe line 7 and the filling machine 2.

Figure 6:
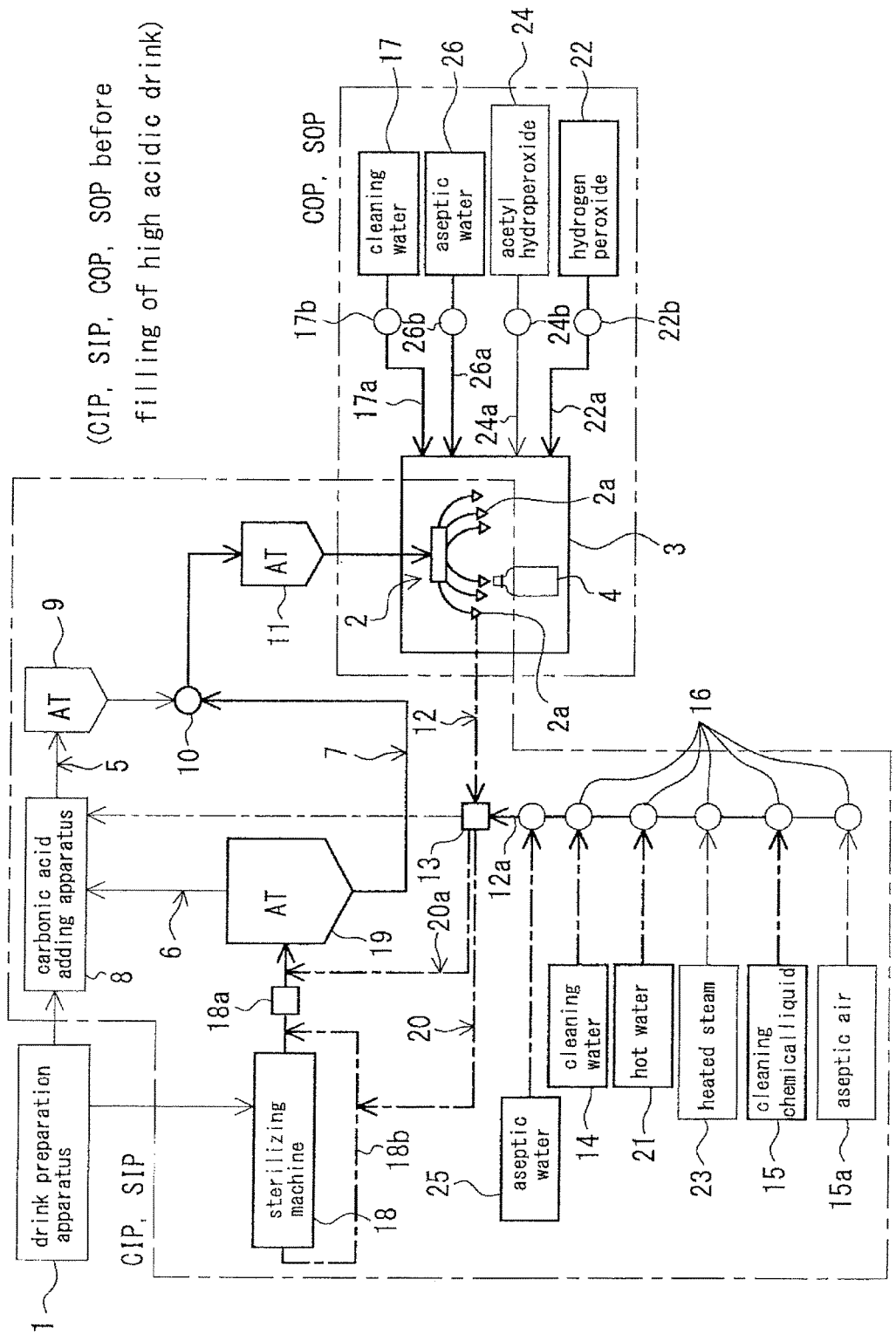
FIG. 6 is a block diagram illustrating a state in which a CIP treatment, an SIP treatment, a COP treatment and a SOP treatment are performed before production of a bottled product of a high acidic drink.
Figure 8:
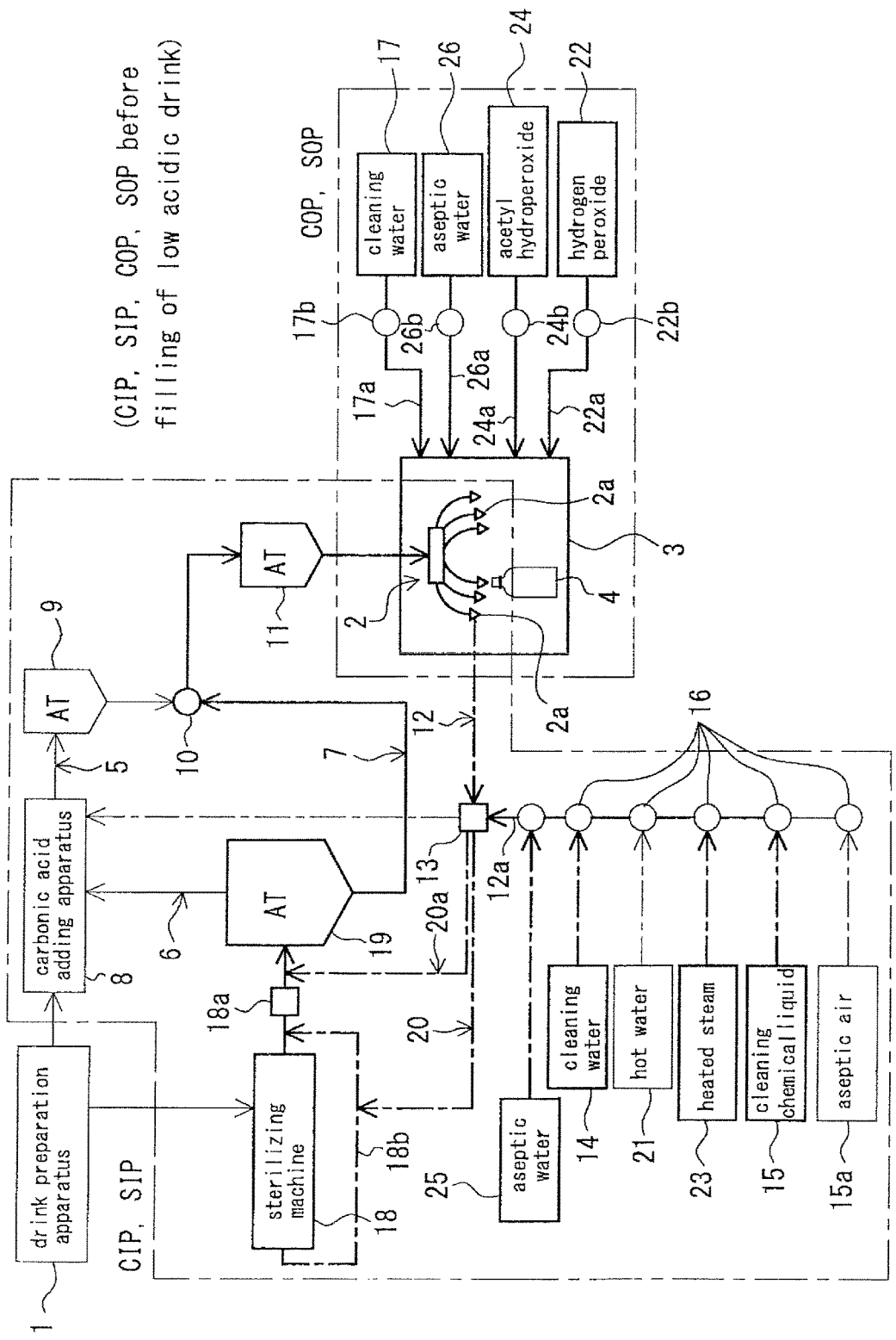
FIG. 8 is a block diagram illustrating a state in which a CIP treatment, an SIP treatment, a COP treatment and a SOP treatment are performed before production of a bottled product of a low acidic drink.

That is, as shown with thick line in FIG. 6 or 8, a circulation path is provided by connection the CIP/SIP treatment pipe line and the third supply pipe line 7.

More specifically, the first circulation path for the second supply pipe line 6 is commonly used for the third supply line 7. However, the second circulation path for the third supply pipe line 7 is provided among the third aseptic tank 19, the second aseptic tank 11 and the filling machine 2.

Cups corresponding to the first and second supply lines 5 and 6, the CIP treatment pipe line 12 and 20, the valve manifold 13, the introduction conduit 12a, the cleaning water supply source 14, the cleaning chemical liquid supply source 15, the hot water supply source 21, the water steam supply source 23 and the aseptic water supply source 25 are also commonly used for the third supply pipe line 7.

Furthermore, the cleaning water supply source 17 and the hydrogen peroxide supply source 22 for the COP/SOP treatment apparatus shown in FIG. 7 or 9 are also commonly used for the aseptic chamber 3 of the filling machine 2, and the acetyl hydroperoxide supply source 24 is also additionally provided together with the SOP treatment pipe line 24a and the switching valve 24b. In addition, the aseptic water supply source 26 is additionally provided together with the SOP treatment pipe line 26a and the switching valve 26b.

These various switching valves, pumps, actuators and so on for the CIP/SIP and COP/SOP treatment apparatus are controlled by a predetermined controller, not shown, such as sequence controller or like.

At least following three programs are installed inside such controller for executing the predetermined CIP treatment, SIP treatment, COP treatment and SOP treatment by operating the respective switching valves or so.

Figure 10:
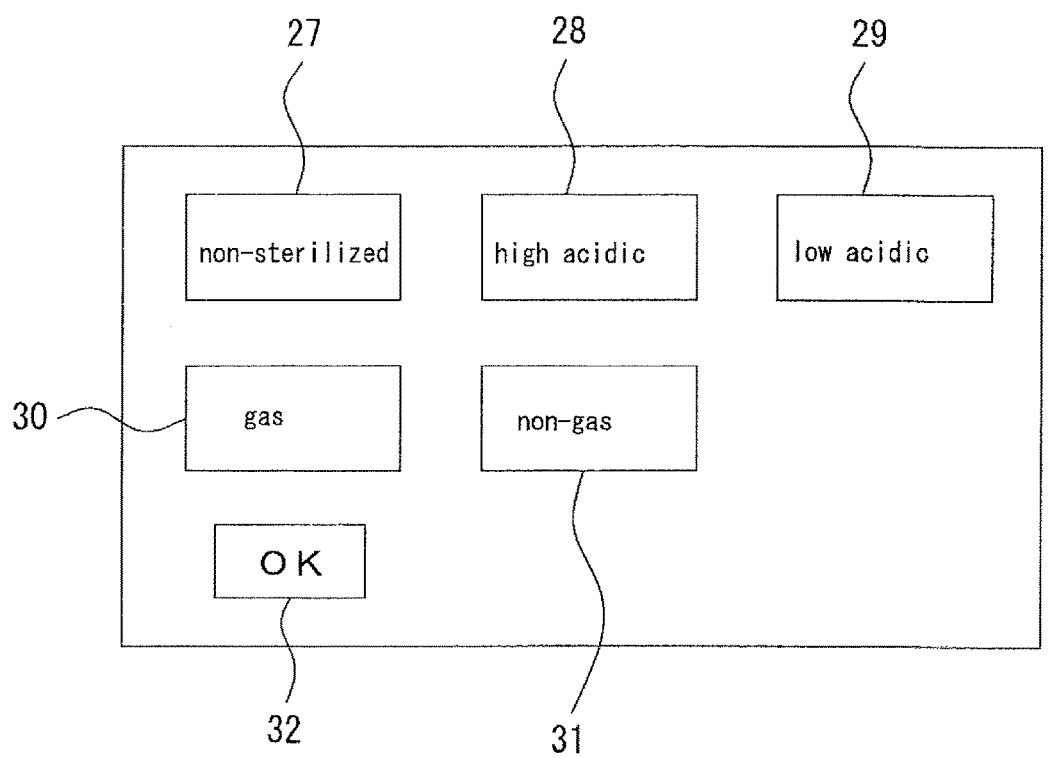
FIG. 10 is a view showing an arrangement of buttons of a control board for selecting a kind of a method of cleaning a drink filling system.

As shown in FIG. 10, on the panel of the controller, many operation buttons are provided, and more specifically, a non-sterilized carbonated drink selection button 27, a high acidic drink selection button 28, a low acidic drink selection button 29, a gas addition selection button 30, a non-gas selection button 31 and an OK button 32.

(a) First Program: this program is for executing the COP treatment to the interior of the aseptic chamber 3 and the CIP treatment to the first supply pipe line 5 and the filling machine 2 in the drink supply system pipe lines.

This first program is executed in a case that a drink for filling is a non-sterilized carbonated drink that does not require any sterilizing treatment (see FIG. 5).

When an operator pushes the non-sterilized carbonated drink selection button 27, and the OK button 32, the COP treatment and the CIP treatment are performed in accordance with the first program.

That is, to the non-sterilized carbonated drink that does not require any sterilizing treatment for subsequent drink filling working, the CIP treatment is performed to the first supply pipe line 5 and the filling machine 2 with the predetermined sequence, and the COP treatment is performed to the aseptic chamber 3 with the predetermined sequence (see FIG. 5). After the completion of such CIP and COP treatments, the filling working for such drink will be performed as shown with thick line in FIG. 2.

(b) Second Program: this second program is for executing the COP treatment to the interior of the aseptic chamber 3, the SOP treatment by the hydrogen peroxide and the aseptic water, and the CIP and SIP treatments to the second supply pipe line 6 and the filling machine 2 in the drink supply pipe line.

This second program is executed in a case that a drink for filling is a high acidic drink (see FIG. 6 or 7).

As described above, since the carbonic acid adding apparatus 8 is provided for the drink supply pipe line, as to the high acidic drink, there is a case of adding carbonic acid or not adding carbonic acid. Then, this program for the high acidic drink involves a first pattern for execution for the case of adding the carbonic acid to the high acidic drink and also includes a second pattern for execution for the case of not adding the carbonic acid to the high acidic drink.

When a manufacturing facility is operated, an operator pushes the high acidic drink selection button 28, the gas addition selection button 30 and the OK button in this order, and thereby, the COP, SOP, CIP and SIP treatments are performed in accordance with the first pattern of the second program.

That is, with respect to the high acidic drink to which carbonic acid supplied for the subsequent filling working is added, the CIP and SIP treatments are performed to the second supply pipe line 6 and the filling machine 2 with the predetermined sequence, and the COP and SOP treatments are performed to the aseptic chamber 3 with the predetermined sequence (see FIG. 7). After the finishing of these CIP, SIP, COP and SOP treatments, the filling working for such drink will be performed as shown with a thick line in FIG. 3.

Further, when the operator pushes the high acidic drink selection button 28, the non-gas selection button 31, and the OK button 32, the COP treatment, the SOP treatment, the CIP treatment, and the SIP treatment are executed in accordance with the second patterns for execution of the second program.

That is, as to the high acidic drink to which carbonic acid for a subsequent filling working is not added, the CIP treatment and the SIP treatment are successively performed for the second supply pipe line 6 and the filling machine 2 in accordance with predetermined procedure, and on the other hand, the COP treatment and the SOP treatment are also performed for the aseptic chamber 3 in accordance with predetermined procedure (see FIG. 6). After finishing of these COP treatment, SOP treatment, CIP treatment, and SIP treatment, the filling working for this drink is performed as shown with a thick line in FIG. 4.

(c) Third Program: this third program is for executing the COP treatment to the interior of the aseptic chamber 3, the SOP treatment by the hydrogen peroxide, the acetyl hydroperoxide and the aseptic water, and the CIP and SIP treatments to the third supply pipe line 6 and the filling machine 2 in the drink supply pipe line.

This third program is executed in a case that a drink for filling is a low acidic drink (see FIG. 8 or 9).

As described above, since the carbonic acid adding apparatus 8 is provided for the drink supply pipe line, as to the low acidic drink, there is a case of adding carbonic acid or not adding carbonic acid. Then, this third program for the low acidic drink involves a first pattern for execution of the third program for the case of adding the carbonic acid to the low acidic drink and also includes a second pattern for execution of the third program for the case of not adding the carbonic acid to the low acidic drink.

When an operator pushes the low acidic drink selection button 29, the gas addition selection button 30 and the OK button 32, and thereby, the COP, SOP, CIP and SIP treatments are performed by the first item of the third program.

That is, with respect to the low acidic drink to which carbonic acid supplied for the subsequent filling working is added, the CIP and SIP treatments are performed to the third supply pipe line 7 and the filling machine 2 with the predetermined sequence, and the COP and SOP treatments are performed to the aseptic chamber 3 with the predetermined sequence (see FIG. 9). After the finishing of these CIP, SIP, COP and SOP treatments, the filling working for such drink will be performed as shown with a thick line in FIG. 3.

Further, when the operator pushes the low acidic drink selection button 29, the non-gas selection button 31, and the OK button 32, the COP treatment, the SOP treatment, the CIP treatment, and the SIP treatment are executed in accordance with the second pattern of the third program.

That is, as to the low acidic drink to which carbonic acid for a subsequent filling working is not added, the CIP treatment and the SIP treatment are successively performed for the third supply pipe line 7 and the filling machine 2 in accordance with predetermined procedure, and on the other hand, the COP treatment and the SOP treatment are also performed for the aseptic chamber 3 in accordance with predetermined procedure (see FIG. 6). After finishing of these COP treatment, SOP treatment, CIP treatment, and SIP treatment, the filling working for this drink is performed as shown with a thick line in FIG. 4.

Hereunder, the cleaning method for the above drink filling system will be explained with reference to FIGS. 5 to 9.

(1) Cleaning before filling of non-sterilized carbonated drink to which any sterilization is not performed:

When the non-sterilized carbonated drink selection button 27 and the OK button 32, corresponding to the first program, in the operation buttons provided on the controller panel are pushed in this order, with respect to the non-sterilized carbonated drink to which any sterilizing treatment is not required for the subsequent filling working, the CIP treatment to the first supply pipe line 5 and the filling machine 2 is performed and the COP treatment to the aseptic chamber 3 is also performed in accordance with predetermined procedure (see FIG. 5).

These CIP treatment and COP treatment are performed in this order or in parallel with each other.

The CIP treatment will be performed in the manner such that a cleaning water is fed from the cleaning water supply source 14, for example, to the predetermined circulation path to thereby clean the first supply pipe line 5 and the filling machine 2, and then, an alkaline cleaning liquid is fed from the cleaning chemical liquid supply source 15 to achieve the cleaning working.

The COP treatment will be performed by spraying a cleaning water from the cleaning water supply source 17, for example, into the aseptic chamber 3.

After the finishing of such CIP and COP treatments, the non-sterilized carbonic drink filling working is performed as shown with a thick line in FIG. 2.

(2) Cleaning before filling of high acidic drink to which carbonic acid is added:

When the high acidic drink selection button 28, the gas addition selection button 30 and the OK button 32, corresponding to the first pattern for execution of the second program, in the operation buttons provided on the controller panel are pushed in this order, with respect to the high acidic drink to which the carbonic acid is added for the subsequent working, the CIP and SIP treatments to the second supply pipe line 6 and the filling machine 2 are performed in accordance with the predetermined procedure, and the COP and SOP treatments to the aseptic chamber 3 are also performed in accordance with the predetermined procedure (see FIG. 7).

These CIP and SIP treatments, and COP and SOP treatments are performed in this order or in parallel with each other.

The CIP treatment will be performed in the manner such that a cleaning water is fed from the cleaning water supply source 14, for example, to the predetermined circulation path to thereby clean the second supply pipe line 6 and the filling machine 2, and then, an alkaline cleaning liquid fed from the cleaning chemical liquid supply source 15 to achieve the cleaning working.

The SIP treatment will be performed in the manner such that a hot water from the hot water supply source 21 passes through the circulation path after the CIP treatment, for example, to thereby clean the second supply pipe line 6 and the filling machine 2, and an aseptic water from the aseptic water supply source 25 passes to cool the filling nozzle 2a and so on of the filling machine 2.

The COP treatment will be performed by spraying a cleaning water from the cleaning water supply source 17, for example, into the aseptic chamber 3.

The SOP treatment is performed by spraying, in the aseptic chamber 3, a hydrogen peroxide water from the hydrogen peroxide supply source 22 and then spraying an aseptic water from the aseptic water supply source 26.

Further, the hydrogen peroxide used for the COP treatment may be in a gaseous state, which is thereafter sprayed into the aseptic chamber 3 by means of spray and is then gasified and dried with hot air.

It is noted that although the aseptic water to be used in the COP and SOP treatments in the aseptic chamber 3 performed before the manufacture of high acidic product is of a normal temperature, it is preferred to use a hot water having temperature of not less than 70° C. but not more than 100° C., and more preferably, not less than 80° C. but not more than 100° C.

After the finishing of such CIP, SIP, COP and SOP treatments, the filling working of this high acidic carbonated drink is performed as shown with a thick line in FIG. 3.

(3) Cleaning before filling of high acidic drink to which carbonic acid is not added:

When the high acidic drink selection button 28, the non-gas selection button 31 and the OK button 32, corresponding to the second pattern for execution of the second program, in the operation buttons provided on the controller panel are pushed in this order, with respect to the high acidic drink to which the carbonic acid is not added for the subsequent working, the CIP and SIP treatments to the third supply pipe line 7 and the filling machine 2 are performed in accordance with the predetermined procedure, and the COP and SOP treatments to the aseptic chamber 3 are also performed in accordance with the predetermined procedure (see FIG. 6).

These CIP and SIP treatments, and COP and SOP treatments are performed in this order or in parallel with each other.

The CIP treatment will be performed in the manner such that a cleaning water is fed from the cleaning water supply source 14, for example, to the predetermined circulation path to thereby clean the third supply pipe line 7 and the filling machine 2, and then, an alkaline cleaning liquid is fed from the cleaning chemical liquid supply source 15 to achieve the cleaning working.

The SIP treatment will be performed in the manner such that a hot water from the hot water supply source 21 passes through the circulation path after the CIP treatment, for example, to thereby clean the third supply pipe line 7 and the filling machine 2, and an aseptic water from the aseptic water supply source 25 passes to cool the filling nozzle 2a and so on of the filling machine 2.

The COP treatment will be performed by spraying a cleaning water from the cleaning water supply source 17, for example, into the aseptic chamber 3.

The SOP treatment is performed by spraying, in the aseptic chamber 3, a hydrogen peroxide water from the hydrogen peroxide supply source 22 and then spraying an aseptic water from the aseptic water supply source 26.

After the finishing of such CIP, SIP, COP and SOP treatments, the filling working of this high acidic carbonated drink is performed as shown with a thick line in FIG. 4.

(4) Cleaning before filling of low acidic drink to which carbonic acid is added:

When the low acidic drink selection button 29, the gas-addition selection button 30 and the OK button 32, corresponding to the first pattern for execution of the third program, in the operation buttons provided on the controller panel are pushed in this order, with respect to the low acidic drink to which the carbonic acid is added for the subsequent working, the CIP and SIP treatments to the second supply pipe line 6 and the filling machine 2 are performed in accordance with the predetermined procedure, and the COP and SOP treatments to the aseptic chamber 3 are also performed in accordance with the predetermined procedure (see FIG. 9).

These CIP and SIP treatments, and COP and SOP treatments are performed in this order or in parallel with each other.

The CIP treatment will be performed in the manner such that a cleaning water is fed from the cleaning water supply source 14, for example, to the predetermined circulation path to thereby clean the second supply pipe line 6 and the filling machine 2, and then, an alkaline cleaning liquid is fed from the cleaning chemical liquid supply source 15 to achieve the cleaning working.

The SIP treatment will be performed in the manner such that a heated steam from the heated steam supply source 23 passes through the circulation path after the CIP treatment, for example, to thereby sterilize the second supply pipe line 6 and the filling machine 2, and an aseptic water from the aseptic water supply source 25 passes as a cooling water to cool the filling machine 2 and so on.

The COP treatment will be performed by spraying a cleaning water from the cleaning water supply source 17, for example, into the aseptic chamber 3.

The SOP treatment is performed by spraying, in the aseptic chamber 3, an acetyl hydroperoxide from the acetyl hydroperoxide supply source 24, an aseptic water from the aseptic water supply source 26, a hydrogen peroxide water from the hydrogen peroxide water supply source 22, and an aseptic water from the aseptic water supply source 26, in this order.

After the finishing of such CIP, SIP, COP and SOP treatments, the filling working of this low acidic carbonated drink is performed as shown with thick line in FIG. 3.

(5) Cleaning before filling of low acidic drink to which carbonic acid is not added:

When the low acidic drink selection button 29, the non-gas selection button 31 and the OK button 32, corresponding to the first item of the third program, in the operation buttons provided on the controller panel are pushed in this order, with respect to the low acidic drink to which the carbonic acid is not added for the subsequent working, the CIP and SIP treatments to the second supply pipe line 6 and the filling machine 2 are performed in accordance with the predetermined procedure, and the COP and SOP treatments to the aseptic chamber 3 are also performed in accordance with the predetermined procedure (see FIG. 8).

These CIP and SIP treatments, and COP and SOP treatments are performed in this order or in parallel with each other.

The CIP treatment will be performed in the manner such that a cleaning water is fed from the cleaning water supply source 14, for example, to the predetermined circulation path to thereby clean the third supply pipe line 7 and the filling machine 2, and then, an alkaline cleaning liquid is fed from the cleaning chemical liquid supply source 15 to achieve the cleaning working.

The SIP treatment will be performed in the manner such that a heated steam from the heated steam supply source 23 passes through the circulation path after the CIP treatment, for example, to thereby sterilize the third supply pipe line 7 and the filling machine 2, and an aseptic water from the aseptic water supply source 25 passes as a cooling water to cool the filling machine 2 and so on.

The COP treatment will be performed by spraying a cleaning water from the cleaning water supply source 17, for example, into the aseptic chamber 3.

The SOP treatment is performed by spraying, in the aseptic chamber 3, an acetyl hydroperoxide from the acetyl hydroperoxide supply source 24, an aseptic water from the aseptic water supply source 26, a hydrogen peroxide water from the hydrogen peroxide water supply source 22, and an aseptic water from the aseptic water supply source 26, in this order.

After the finishing of such CIP, SIP, COP and SOP treatments, the filling working of this low acidic carbonated drink is performed as shown with thick line in FIG. 4.

It is to be noted that although the present invention is constituted as explained hereinabove, the present invention is not limited to the described embodiments, and for example, many other changes and modifications may be made within the subject technologies of the present invention. For example, when the present invention is applied to an apparatus for filling two drinks among an aseptic carbonated drink, a low acidic drink and a high acidic drink, only two programs among the three programs may be executed.

REFERENCE NUMERAL

2 - - - filling machine
3 - - - aseptic chamber
8 - - - carbonic acid adding apparatus

The invention claimed is:

1. A cleaning method of a drink filling system, which is able to supply at least two of a non-sterilized carbonated drink, a high acidic drink and a low acidic drink, and is provided with a drink supply pipe line for supplying a drink to a filling machine and an aseptic chamber surrounding at least the filling machine, the drink filling system including at least two of first, second and third programs, wherein the first program corresponds to the non-sterilized carbonated drink and executes a COP treatment, which is cleaning of the aseptic chamber by supplying cleaning liquid into the chamber, performed in an interior of the aseptic chamber and a CIP treatment, which is cleaning of the drink supply pipe line by supplying cleaning liquid into the drink supply pipe line, performed in an interior of the drink supply pipe line, the second program corresponds to the high acidic drink and executes the COP treatment and an SOP treatment, which is sterilizing of the aseptic chamber, performed in the interior of the aseptic chamber and a CIP treatment and an SIP treatment, which is sterilizing of the drink supply pipe line, performed in the interior of the drink supply pipe line, and the third program corresponds to the low acidic drink and executes the COP treatment and the SOP treatment performed for the interior of the aseptic chamber and the CIP treatment and the SIP treatment performed in the interior of the drink supply pipe line, and the programs are installed inside a drink filling system controller for executing the predetermined CIP treatment, SIP treatment, COP treatment and SOP treatment by operating respective switching valves, and operation buttons are provided on the panel of the drink filling system controller, wherein the cleaning method is performed by selectively executing one of the three programs by pushing one of the operation buttons, and in a case where the drink is the non-sterilized carbonated drink, the first program is selected, in a case where the drink is the high acidic drink, the second program is selected, and in a case where the drink is the low acidic drink, the third program is selected, to thereby clean the interiors of the aseptic chamber and the drink supply pipe line before filling of the drink in accordance with the selected program, wherein the CIP treatment in the first program is executed through a first circulation path such that the first circulation path includes a first Supply pipe line, a first aseptic tank, a switch valve, a second aseptic tank, a filling nozzle, a CIP treatment pipe line, and a valve manifold, and wherein the CIP treatment and the SIP treatment in second and third programs are executed through a second circulation path such that the second circulation path includes a third aseptic tank, the switch valve, the second aseptic tank, the filling nozzle, the CIP treatment pipe line, the valve manifold.

2. The cleaning method according to claim 1, wherein the CIP treatment performed by the first to third programs includes a CIP treatment using alkali cleaning liquid.

3. The cleaning method according to claim 1, wherein the drink supply pipe line is provided with a carbonic acid adding apparatus, the second program for the high acidic drink includes two patterns including a carbonic acid addition case and a carbonic acid non-addition case, and the third program for the low acidic drink includes two patterns including a carbonic acid addition case and a carbonic acid non-addition case.

4. The cleaning method according to claim 3, wherein the second circulation path for the carbonic acid addition case further includes the second supply pipe line and first supply line, and wherein the second circulation path for the carbonic acid non-addition case further includes a third supply pipe line.

* * * * *